(12) United States Patent
Eo et al.

(10) Patent No.: US 10,202,111 B2
(45) Date of Patent: Feb. 12, 2019

(54) NON-UNIFORM DISPLACEMENT ENGINE CONTROL SYSTEM EMPLOYING CYLINDER DEACTIVATION AND METHOD FOR CONTROLLING NON-UNIFORM DISPLACEMENT ENGINE CONTROL SYSTEM EMPLOYING CYLINDER DEACTIVATION

(71) Applicant: HYUNDAI MOTOR COMPANY, Seoul (KR)

(72) Inventors: Jeong Soo Eo, Hwaseong-si (KR); Ji Won Oh, Hwaseong-si (KR); Sung Jae Kim, Suwon-si (KR); Ba Ro Hyun, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 48 days.

(21) Appl. No.: 15/264,812

(22) Filed: Sep. 14, 2016

(65) Prior Publication Data
US 2017/0080916 A1    Mar. 23, 2017

(30) Foreign Application Priority Data

Sep. 17, 2015 (KR) .......................... 10-2015-0131356
Jul. 19, 2016 (KR) .......................... 10-2016-0091595

(51) Int. Cl.
*B60W 20/15* (2016.01)
*B60W 20/17* (2016.01)
(Continued)

(52) U.S. Cl.
CPC ............ *B60W 20/10* (2013.01); *B60W 10/06* (2013.01); *B60W 10/08* (2013.01); *B60W 20/15* (2016.01);
(Continued)

(58) Field of Classification Search
CPC ...... B60W 20/15; B60W 20/17; B60W 10/06; B60W 10/08; B60W 30/18
(Continued)

(56) References Cited

U.S. PATENT DOCUMENTS 4,411,230 A * 10/1983 Lee ..................... F02D 41/0087
                                                    123/198 F
5,374,224 A    12/1994 Huffmaster et al.
(Continued)

FOREIGN PATENT DOCUMENTS

JP     07-208222 A    8/1995
JP     07-229754 A    8/1995
(Continued)

OTHER PUBLICATIONS

Non-Final Office Action dated Jan. 17, 2017, issued in U.S. Appl. No. 14/954,450.
(Continued)

*Primary Examiner* — Yazan A Soofi
(74) *Attorney, Agent, or Firm* — McDermott Will & Emery LLP

(57) ABSTRACT

A non-uniform displacement engine control system employing cylinder deactivation includes a non-uniform displacement engine including a plurality of cylinders, the cylinders including at least two sizes of cylinders having different displacements, a motor connected to a driving shaft of the engine, a battery for supplying electrical energy to the motor, and a motor control unit for controlling the motor, wherein the motor control unit controls total torque by adjusting motor driving torque or energy regeneration torque and performs control such that cylinder deactivation (CDA) is performed after selectively performing a transient state transition based on a previous control mode at a time of switching to a CDA control mode.

22 Claims, 11 Drawing Sheets

(51) Int. Cl.
| | |
|---|---|
| *B60W 10/06* | (2006.01) |
| *B60W 10/08* | (2006.01) |
| *B60W 30/18* | (2012.01) |
| *B60W 30/20* | (2006.01) |
| *B60W 20/10* | (2016.01) |
| *F02D 17/02* | (2006.01) |
| *F02D 41/00* | (2006.01) |
| *F02D 29/02* | (2006.01) |
| *B60K 6/48* | (2007.10) |
| *B60W 20/00* | (2016.01) |

(52) U.S. Cl.
CPC ............ *F02D 17/02* (2013.01); *F02D 29/02* (2013.01); *F02D 41/0087* (2013.01); *B60K 6/48* (2013.01); *B60K 2006/4825* (2013.01); *B60W 20/00* (2013.01); *B60W 2030/206* (2013.01); *B60W 2710/083* (2013.01); *F02D 2250/21* (2013.01); *F02D 2250/24* (2013.01); *Y02T 10/6221* (2013.01); *Y02T 10/6252* (2013.01); *Y02T 10/6286* (2013.01); *Y02T 10/7258* (2013.01); *Y10S 903/905* (2013.01); *Y10S 903/906* (2013.01)

(58) Field of Classification Search
USPC ............................................................ 701/22
See application file for complete search history.

(56) References Cited

U.S. PATENT DOCUMENTS

| | | | |
|---|---|---|---|
| 5,437,253 A | 8/1995 | Huffmaster et al. | |
| 5,722,359 A | 3/1998 | Chubachi et al. | |
| 7,240,749 B2 | 7/2007 | Bhaysar et al. | |
| 9,440,640 B1 | 9/2016 | Pritchard et al. | |
| 9,790,867 B2 * | 10/2017 | Carlson | F02D 17/02 |
| 2002/0116099 A1 * | 8/2002 | Tabata | B60K 6/32 |
| | | | 701/22 |
| 2004/0012206 A1 | 1/2004 | Wakashiro et al. | |
| 2005/0011690 A1 | 1/2005 | Bhavsar et al. | |
| 2005/0164826 A1 | 7/2005 | Albertson | |
| 2006/0032684 A1 | 2/2006 | Rayl | |
| 2006/0196463 A1 | 9/2006 | Pallett et al. | |
| 2007/0078586 A1 * | 4/2007 | Pallett | B60K 6/445 |
| | | | 701/101 |
| 2007/0131183 A1 * | 6/2007 | Shei | F02B 73/00 |
| | | | 123/48 R |
| 2007/0209618 A1 * | 9/2007 | Leone | B60K 6/24 |
| | | | 123/90.12 |
| 2007/0209619 A1 * | 9/2007 | Leone | B60W 10/06 |
| | | | 123/90.12 |
| 2009/0259380 A1 | 10/2009 | Picron et al. | |
| 2010/0042279 A1 | 2/2010 | Thompson et al. | |
| 2011/0115439 A1 | 5/2011 | Kim | |
| 2013/0096759 A1 * | 4/2013 | Breton | B60W 20/10 |
| | | | 701/22 |
| 2013/0255639 A1 * | 10/2013 | Guillen Castillo | B60W 10/08 |
| | | | 123/472 |
| 2013/0276755 A1 | 10/2013 | Springer et al. | |
| 2013/0289810 A1 * | 10/2013 | Holmes | B60K 6/24 |
| | | | 701/22 |
| 2015/0203105 A1 * | 7/2015 | Liang | B60L 15/20 |
| | | | 701/22 |
| 2015/0314773 A1 * | 11/2015 | Zhou | B60W 10/06 |
| | | | 701/22 |

FOREIGN PATENT DOCUMENTS

| | | |
|---|---|---|
| JP | 08-312393 A | 11/1996 |
| JP | 2002-013423 A | 1/2002 |
| JP | 2002276416 A | 9/2002 |
| JP | 2004-052573 A | 2/2004 |
| JP | 2004108342 A | 4/2004 |
| JP | 2007-069860 A | 3/2007 |
| JP | 2007-162672 A | 6/2007 |
| JP | 2010-247830 A | 11/2010 |
| JP | 2011-051383 A | 3/2011 |
| JP | 2015-101959 A | 6/2015 |
| KR | 1997-0044043 A | 7/1997 |
| KR | 10-2006-0069095 A | 6/2006 |
| KR | 10-2011-0054135 A | 5/2011 |
| KR | 10-1091664 B1 | 12/2011 |
| KR | 10-2013-0106482 A | 9/2013 |
| KR | 10-2014-0059680 A | 5/2014 |

OTHER PUBLICATIONS

Non-Final Office Action issued in related U.S. Appl. No. 15/266,680, dated Nov. 21, 2017.
Non-Final Office Action issued in related U.S. Appl. No. 15/266,622, dated Feb. 9, 2018.
U.S. Final Office Action issued in U.S. Appl. No. 14/954,450, dated Jul. 3, 2017.
Extended European Search Report dated Jan. 26, 2017, issued in European Application No. 15197480.5.
Non-Final Office Action issued in U.S. Appl. No. 14/954,450, dated Jan. 11, 2018.
Non-Final Office Action issued in U.S. Appl. No. 15/264,998, dated Mar. 21, 2018.
Notice of Allowance issued in U.S. Appl. No. 15/266,680, dated Apr. 4, 2018.
Final Office Action issued in U.S. Appl. No. 14/954,450, dated Jun. 28, 2018.

* cited by examiner

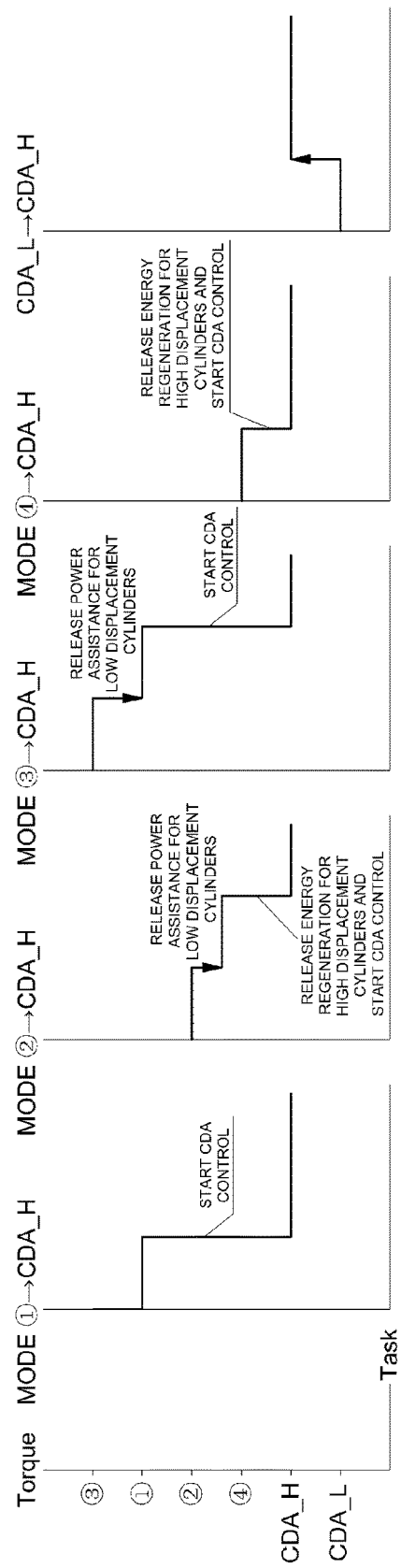

NON-UNIFORM DISPLACEMENT ENGINE CONTROL SYSTEM EMPLOYING CYLINDER DEACTIVATION AND METHOD FOR CONTROLLING NON-UNIFORM DISPLACEMENT ENGINE CONTROL SYSTEM EMPLOYING CYLINDER DEACTIVATION

CROSS-REFERENCE TO RELATED APPLICATION

This application claims under 35 U.S.C. § 119(a) the benefit of priority to Korean Patent Application Nos. 10-2015-0131356 and 10-2016-0091595, filed on Sep. 17, 2015 and Jul. 19, 2016 with the Korean Intellectual Property Office, respectively, the entire contents of which are incorporated herein by reference.

TECHNICAL FIELD

The present disclosure relates to a non-uniform displacement engine control system employing cylinder deactivation and a method for controlling the non-uniform displacement engine control system employing cylinder deactivation. More particularly, the present disclosure relates to a system and method for controlling an engine and a motor of a vehicle, wherein the engine includes cylinders having different displacements and the motor supplements a driving force of the engine.

BACKGROUND

A conventional internal combustion engine is generally configured such that cylinders have uniform displacements in order to satisfy the distribution characteristics of intake and exhaust systems. The uniform displacement engine has an advantage in that it is possible to easily control the air-to-fuel ratio and exhaust gas. However, the uniform displacement engine has a disadvantage in that a margin for operation point control is insufficient due to the fixed displacement thereof. As a result, it is difficult to satisfy, or optimize, both operation efficiency and fuel efficiency at a specific operation zone, and therefore problems must be addressed by compromising both, or one of, operation efficiency and fuel efficiency.

In addition, in the engine having fixed displacement cylinders, excessive mechanical energy is consumed in order to secure stable idling, which is inefficient. In particular, operation point control is inevitably and frequently inefficient due to the limitations imposed by vibration and noise.

Such problems, which frequently occur over the entire operation zone of the conventional internal combustion engine, are solved by balancing between operation efficiency, fuel efficiency and exhaust properties.

Meanwhile, Japanese Patent Laid-Open Publication No. 2007-162672 discloses a cylinder arrangement structure of a multi-stage type displacement adjustable engine in which cylinders having different displacements are arranged such that the displacement of the engine is adjusted in multiple stages based on operational combinations of the cylinders.

The cylinder arrangement structure of the multi-stage type displacement adjustable engine disclosed in Japanese Patent Laid-Open Publication No. 2007-162672 has effects in that the displacement of the engine is adjusted in multiple stages, and therefore it is possible to control the operation of the engine in respective operation zones, thereby simultaneously improving operation efficiency and fuel efficiency, but has problems in that vibration and noise are generated due to imbalances in displacements among the cylinders, making it difficult to apply the cylinder arrangement structure of the multi-stage type displacement adjustable engine to vehicles that are mass-produced.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a non-uniform displacement engine control system and method that are capable of reducing vibration and noise generated by a non-uniform displacement engine including cylinders having different displacements and of securing various levels of power performance based on driving conditions through the cooperation of the engine and a motor.

It is another object of the present disclosure to extend an efficient operation zone of a non-uniform displacement engine by performing cylinder deactivation (CDA) control on all cylinders of the engine.

It is a further object of the present disclosure to perform smooth switching to a CDA control mode.

In one aspect, the present disclosure provides a non-uniform displacement engine control system employing cylinder deactivation including a non-uniform displacement engine including a plurality of cylinders, the cylinders including at least two sizes of cylinders having different displacements, a motor connected to a driving shaft of the engine, a battery for supplying electrical energy to the motor, and a motor control unit for controlling the motor, wherein the motor control unit controls total torque by adjusting motor driving torque or energy regeneration torque and performs control such that cylinder deactivation (CDA) is performed after selectively performing a transient state transition based on a previous control mode at the time of switching to a CDA control mode.

In an embodiment, at the time of the transient state transition, the motor control unit may adjust the motor driving torque or the energy regeneration torque such that the total torque is reduced in the previous control mode.

In another embodiment, at the time of the transient state transition, the motor control unit may determine whether power assistance is being performed by the motor in the previous control mode and, upon determining that the power assistance is being performed by the motor, may perform control such that the power assistance by the motor is released.

In still another embodiment, at the time of the transient state transition, the motor control unit may determine whether torque is reduced due to energy regeneration in the previous control mode and, upon determining that energy regeneration is being performed, may perform control such that the energy regeneration is selectively released based on information about deactivated cylinders.

In yet another embodiment, upon determining that energy regeneration is being performed in the previous control mode, the motor control unit may perform control such that the energy regeneration is released in a case in which the deactivated cylinders are low displacement cylinders.

In still yet another embodiment, upon determining that the energy regeneration is being performed in the previous control mode, the motor control unit may perform control such that the energy regeneration is maintained in a case in which the deactivated cylinders are high displacement cylinders.

In a further embodiment, upon determining that the energy regeneration is not being performed in the previous control mode, the motor control unit may perform control such that energy regeneration by the motor is performed so as to achieve the transient state transition in a case in which power assistance is not performed in the previous control mode and the deactivated cylinders are high displacement cylinders.

In another further embodiment, the motor control unit may perform control such that the release of the energy regeneration and the CDA control are performed simultaneously.

In still another further embodiment, in the case in which the previous control mode is a CDA control mode for high displacement cylinders, the motor control unit may perform control such that switching to a CDA control mode for low displacement cylinders is performed after a transient state transition process of controlling the motor such that the energy regeneration is performed in explosion strokes of the high displacement cylinders, and in the case in which the previous control mode is a CDA control mode for low displacement cylinders, the motor control unit may perform control such that switching to a CDA control mode for high displacement cylinders is performed after a transient state transition process of controlling the motor such that the power assistance by motor torque is performed in explosion strokes of the low displacement cylinders.

In yet another further embodiment, the non-uniform displacement engine may include two sets of cylinders, each set of cylinders comprising two cylinders having the same displacement.

In still yet another further embodiment, the non-uniform displacement engine may be configured such that first and fourth cylinders have higher displacement than second and third cylinders, and each set of cylinders alternately performs an explosion stroke.

In a still further embodiment, the motor control unit may have a first mode for performing control such that power assistance and energy regeneration by the motor are not performed, a second mode for controlling the motor such that energy regeneration is achieved in explosion strokes of high displacement cylinders and controlling the motor such that power assistance is achieved by motor torque in explosion strokes of low displacement cylinders, a third mode for controlling the motor such that the motor is not driven in the explosion strokes of the high displacement cylinders and controlling the motor such that power assistance is achieved by motor torque in the explosion strokes of the low displacement cylinders, and a fourth mode for controlling the motor such that energy regeneration is achieved in the explosion strokes of the high displacement cylinders and controlling the motor such that the motor is not driven in the explosion strokes of the low displacement cylinders.

In a yet still further embodiment, in the case in which the CDA control mode to which the previous control mode is switched is a CDA control mode for the high displacement cylinders, the motor control unit may performs switching to the CDA control mode after a transient state transition in which the energy regeneration for the high displacement cylinders is performed when the previous control mode is the first mode, switching to the CDA control mode after a transient state transition in which the power assistance by the motor for the low displacement cylinders is released when the previous control mode is the second mode, switching to the CDA control mode after a transient state transition in which the power assistance by the motor for the low displacement cylinders is released when the previous control mode is the third mode, and switching to the CDA control mode without transient state transition when the previous control mode is the fourth mode.

In another yet still further embodiment, in the case in which the CDA control mode to which the previous control mode is switched is a CDA control mode for the low displacement cylinders, the motor control unit may perform switching to the CDA control mode without transient state transition when the previous control mode is the first mode, switching to the CDA control mode simultaneously with release of the energy regeneration for the high displacement cylinders after a transient state transition in which the power assistance by the motor for the low displacement cylinders is released when the previous control mode is the second mode, switching to the CDA control mode after a transient state transition in which the power assistance by the motor for the low displacement cylinders is released when the previous control mode is the third mode, and switching to the CDA control mode without transient state transition when the previous control mode is the fourth mode.

In another aspect, the present disclosure provides a control method of a system including a non-uniform displacement engine including a plurality of cylinders, the cylinders including at least two kinds of cylinders having different displacements, a motor connected to a driving shaft of the engine, and a motor control unit for controlling the motor, the control method including (a) driving the non-uniform displacement engine, (b) determining motor driving torque or energy regeneration torque based on a predetermined control mode by the motor control unit, (c) controlling the motor based on the determined motor driving torque or energy regeneration torque, (d) determining whether to perform switching to a CDA control mode, and (e) when switching to the CDA control mode is performed, performing CDA after selective transient state transition based on a previous control mode.

In an embodiment, at the time of the transient state transition, the motor control unit may adjust the motor driving torque or the energy regeneration torque such that total torque is reduced in the previous control mode.

Other aspects and embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein:

FIG. 11 is a view showing switching from a previous control mode to a CDA_H control mode according to an embodiment of the present disclosure.

Figure 1:
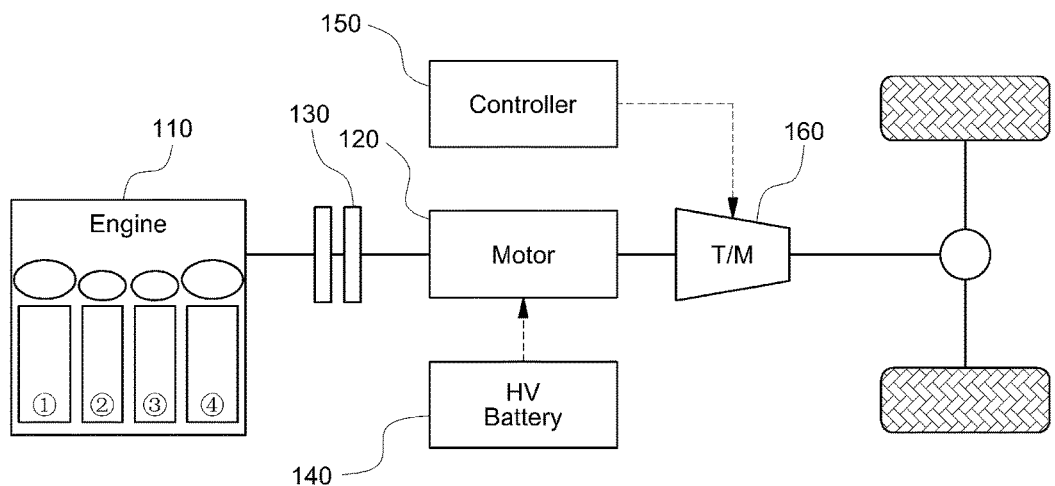
FIG. 1 is a view schematically showing a non-uniform displacement engine control system according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure proposes a new-concept non-uniform displacement engine control system that performs control using a motor in a system including a non-uniform displacement engine including cylinders having different displacements, thereby achieving different displacements based on driving conditions, and a method for the controlling a non-uniform displacement engine control system that performs control using a motor in a system including a non-uniform displacement engine. In particular, the present disclosure has another characteristic in that a system depending upon the conventional inefficient use of mechanical energy is configured to utilize electrical energy, which is more efficient, thereby improving overall system efficiency.

In addition, the present disclosure has another characteristic in that an efficient operation zone of the non-uniform displacement engine is extended by performing cylinder deactivation (CDA) control on all cylinders of the engine. In particular, the present disclosure has a further characteristic in that a transient state transition process is selectively performed when switching from a predetermined control mode to a CDA control mode is performed, whereby smooth mode switching is achieved without discomfort which may be caused at the time of entry into CDA.

The present disclosure may be configured such that high displacement cylinders and low displacement cylinders are arranged to execute a high displacement mode and a low displacement mode based on driving conditions, thereby improving fuel efficiency and power performance using the increase in potential energy and kinetic energy of displacement. In addition, the proportion of a vibration/noise generation area that can be controlled by the motor is increased, thereby achieving more advantageous driving benefit and experience.

In an embodiment of the present disclosure, the non-uniform displacement engine has a four-cylinder structure including two cylinders of one kind (or size) having the same displacement as each other and two cylinders of the other kind (or size) having the same displacement as each other. However, the present disclosure is not limited thereto, and it should be noted that extensions and modifications are possible so long as the technical spirit of the present disclosure is not changed.

Hereinafter, a motor-assisted non-uniform displacement engine control system according to an embodiment of the present disclosure and a method for controlling a motor-assisted non-uniform displacement engine control system according to an embodiment of the present disclosure will be described in detail with reference to the accompanying drawings.

FIG. 1 is a view schematically showing a motor-assisted non-uniform displacement engine control system according to embodiments of the present disclosure.

As shown in FIG. 1, the system may include an engine 110 and a motor 120 as driving sources that provide driving torque necessary to propel a vehicle.

Driving shafts of the engine 110 and the motor 120 are connected to each other via a power switching unit 130, such as a clutch. However, the present disclosure is not limited thereto. The driving shafts of the engine 110 and the motor 120 may be directly connected to each other. In addition, the system may include a battery 140 for supplying electrical energy to the motor 120 and a motor control unit 150 for controlling the operation of the motor. In the present disclosure, the battery is used as an electrical energy supply means. However, the present disclosure is not limited thereto as long as the electrical energy supply means can supply the electrical energy necessary to drive the motor 120 while also storing the electrical energy.

In addition, although not shown, the system may include an engine control unit for controlling the engine 110. The engine control unit and the motor control unit may be controlled by a higher-level controller. In addition, the engine control unit and the motor control unit may be integrated into a single controller.

In addition, driving torque from the engine 110 and the motor 120 may be transmitted to driving wheels via a transmission 160.

Meanwhile, as shown in FIG. 1, the control system of the present disclosure may include a non-uniform displacement engine including a plurality of at least two kinds or size of cylinders having different displacements.

The non-uniform displacement engine may be characterized by different displacements for respective cylinders, and may select the merits and demerits of high displacement and low displacement based on a controllable strategy in order to improve fuel efficiency and power performance. In addition, according to the present disclosure, which may be configured as a system assisted by the motor, it is possible to compensate for the characteristics of each cylinder utilizing the motor. Moreover, it is possible to improve driving efficiency and to optimize energy efficiency through energy recovery. In particular, unlike the related art in which excessive mechanical energy is used in order to ensure stable idling, it is possible to ensure stable idling utilizing the electrical energy of the motor. In addition, it is possible to mitigate vibration and noise utilizing the motor.

For example, as shown in FIG. 1, the non-uniform displacement engine may have a four-cylinder structure including two cylinders of one kind or size having the same displacement, and two cylinders of another kind or size having the same displacement.

The non-uniform displacement may be set based on the characteristics of the system. The cylinders are symmetrically arranged in ignition (explosion) order such that a vibration component caused by the difference in displacement can be offset partially or entirely.

That is, in explosion order 1-3-4-2 or 1-2-4-3, cylinders located at corresponding positions, i.e. the first and fourth cylinders and the second and third cylinders may have the same displacement, and the other cylinder group may have different displacements.

For example, the first and fourth cylinders may have a relatively high displacement, and the second and third cylinders may have a relatively low displacement as compared to the first and fourth cylinders. This case is shown in FIG. 1.

According to this cylinder arrangement, it is possible to offset a vibration component based on the arrangement of the cylinders at corresponding positions, thereby improving vibration and noise characteristics.

In a case in which the engine is configured as a four-cylinder engine having a total displacement of 1.5 L according to a first embodiment, the first and fourth cylinders may have a high displacement of 0.4 L for each of the two cylinders, and the second and third cylinders may have a low displacement of 0.35 L for each of the two cylinders.

According to the first embodiment, the four-cylinder engine may be ignited in the order 1-3-4-2, and cylinders having different displacements may be arranged so as to correspond to the opposite cylinders in the ignition order, in order to offset a vibration component which may be caused due to the non-uniform displacement.

Figure 2:
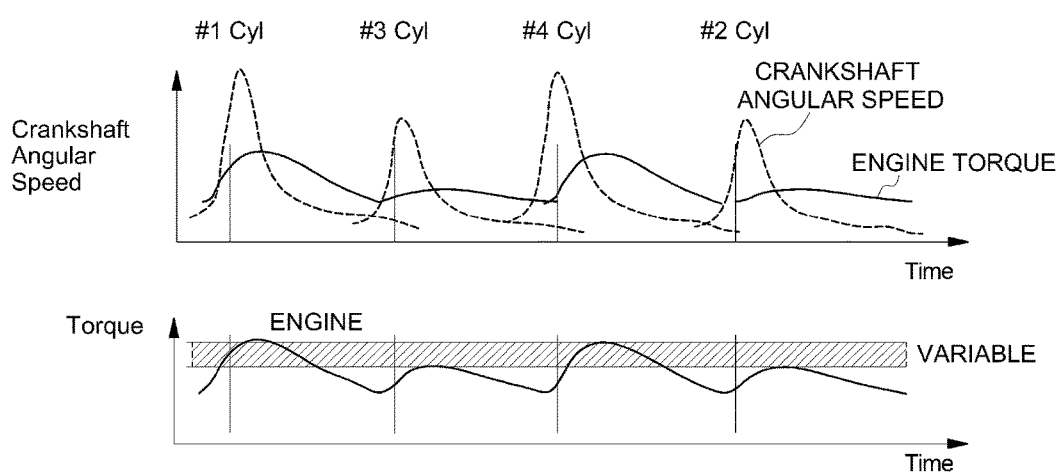
FIG. 2 is a graph showing the dynamic characteristics of a non-uniform displacement engine according to embodiments of the present disclosure.

FIG. 2 is a graph showing dynamic characteristics of a non-uniform displacement engine according to the first embodiment.

As shown in FIG. 2, the first and fourth cylinders, which are high displacement cylinders, have higher torques and crankshaft angular speeds, which are generated as a result of explosions, than the second and third cylinders. That is, referring to the crankshaft angular speed and the engine torque in the explosion (or power) stroke of each cylinder, the high displacement cylinders have higher crankshaft angular speeds and engine torques than the lower displacement cylinders.

The explosion stroke of each cylinder means a period set based on the same criteria, such as crank angles before and after the explosion of each cylinder or the distance from a top dead center (TDC) to the upper end of a piston that is set.

The difference in displacement among the cylinders causes non-uniform driving of the engine, resulting in vibration and noise.

Meanwhile, an embodiment of the present disclosure includes motor control for compensating for non-uniform engine driving characteristics.

Figure 3:
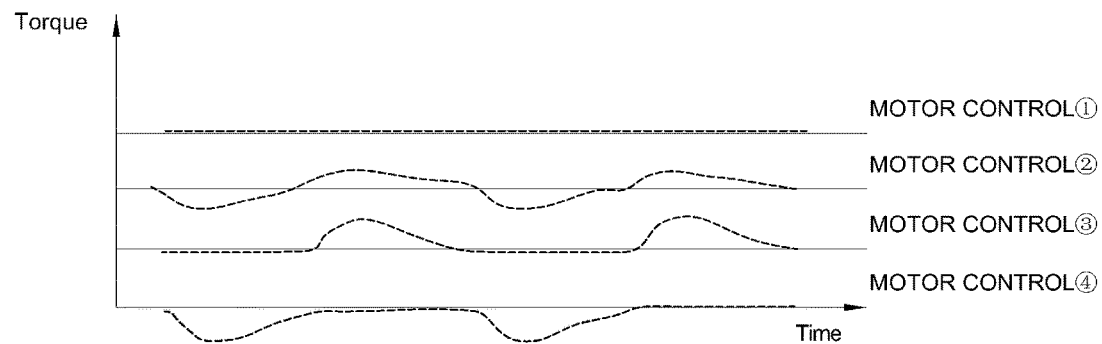
FIG. 3 is a graph showing motor torque control that assists torque output from a non-uniform displacement engine according to embodiments of the present disclosure.

FIG. 3 shows examples of such motor control. Specifically, FIG. 3 shows examples of motor torque control assisting torque output from a non-uniform displacement engine. In addition, FIGS. 4A to 4D respectively show motor control methods according to motor control modes ① to ④ shown in FIG. 3.

FIG. 3 shows motor control modes ① to ④. In motor control mode ①, the motor is not driven, or the motor is controlled to generate uniform driving torque. In motor control modes ② to ④, the motor is controlled differently in respective explosion strokes of the non-uniform displacement engine.

Figure 4A:
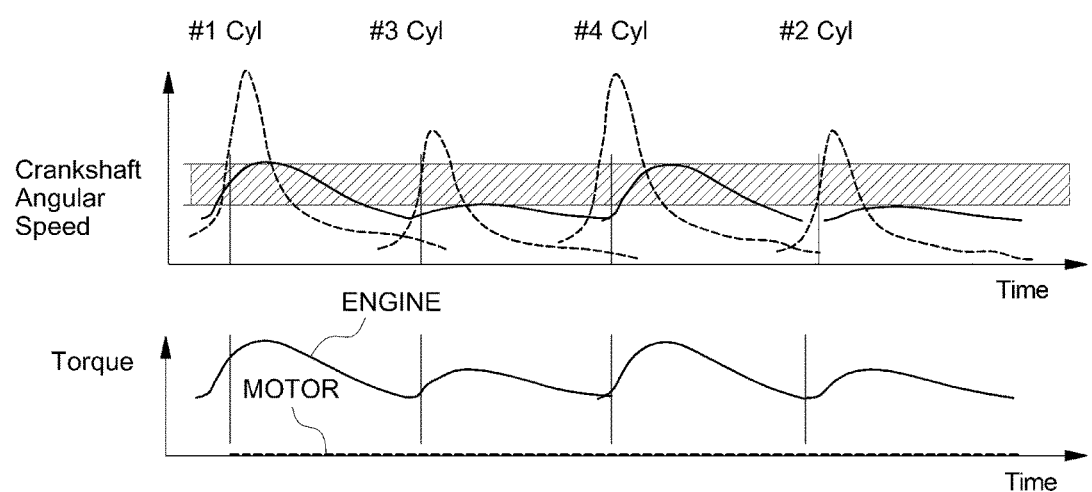
FIGS. 4A to 4D are graphs showing a control method of a motor-assisted non-uniform displacement engine control system according to embodiments of the present disclosure.

Particularly, in motor control mode ①, as shown in FIG. 4A, the motor is not driven, or the motor is controlled to generate uniform driving torque. Since pulsation components of the high displacement cylinders and the lower displacement cylinders are utilized, the unique driving characteristics of the non-uniform displacement engine remain unchanged (the crankshaft angular speed is not changed).

Consequently, it is possible to improve driving efficiency and fuel efficiency at a high efficiency point utilizing increments in kinetic energy of the high displacement cylinders and to improve responsiveness in a transient state and power performance utilizing the increase in potential energy.

Meanwhile, in motor control modes ② to ④, the motor is controlled differently in respective explosion strokes of the non-uniform displacement engine. In motor control mode ②, power assistance and energy regeneration are proportionally controlled in order to minimize a vibration component. Motor control mode ③ is used for traveling at the maximum power and motor control mode ④ is used for traveling at the minimum power.

That is, in motor control modes ② to ④, the motor is selectively controlled by the motor control unit. The motor control may be performed in order to compensate for the difference in torque due to the different displacements of the cylinders. In the explosion stroke of each cylinder, therefore, the motor may be controlled such that the sum of the engine torque and the motor torque is uniform using driving of the motor or energy regeneration by the motor. Motor control modes ② to ④ are respectively shown in FIGS. 4B to 4D. In each torque graph, the solid line indicates engine torque, and the dotted line indicates motor torque. In addition, it can be seen from a comparison with FIG. 4A that it is possible to obtain uniform crankshaft angular speed through power assistance or energy regeneration by the motor.

Figure 4B:
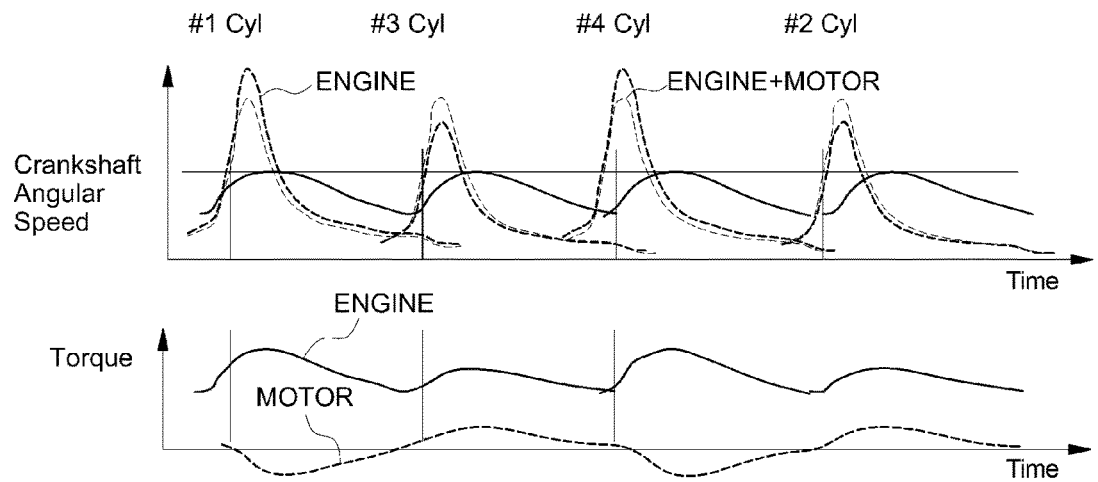

Specifically, in motor control mode ②, a target displacement is set, and the driving torque of the engine and the motor is set based on the target displacement, such that the motor has uniform output characteristics in all explosion strokes. As shown in FIG. 4B, the motor is controlled such that negative torque is generated through energy regeneration by the motor in the explosion strokes of the high displacement cylinders, and the motor is controlled such that positive torque is generated by the motor to achieve power assistance in the explosion strokes of the low displacement cylinders. The motor is controlled to have uniform output characteristics in the respective explosion strokes, and thus it is possible to minimize a vibration component of the non-uniform displacement engine.

Figure 4C:
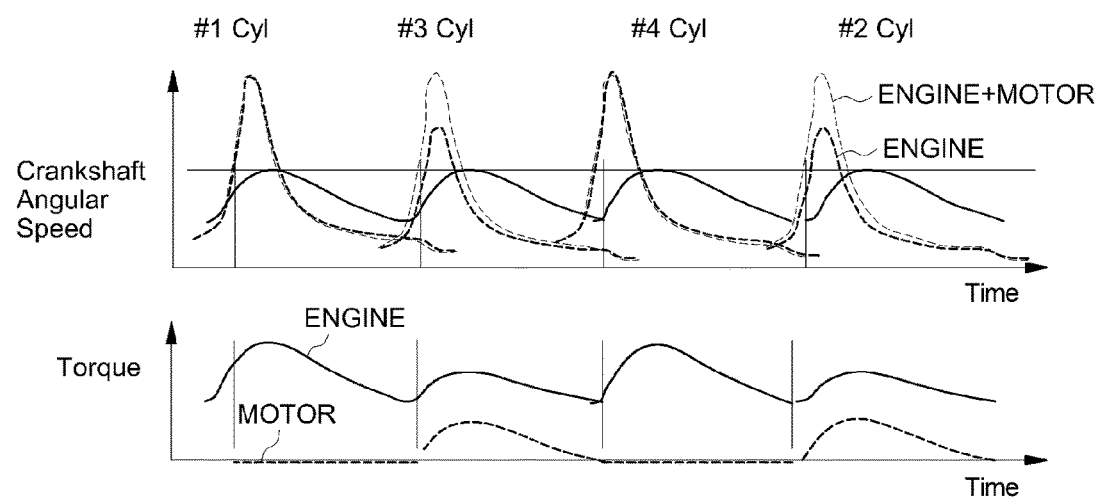

Motor control mode ③ is used for traveling at the maximum power of the non-uniform displacement engine. The motor is controlled such that the low displacement cylinders are assisted by the motor to achieve the maximum power of the given non-uniform displacement. In motor control mode ③, the motor may be controlled such that the same power performance as in the explosion strokes of the high displacement cylinders is achieved in the explosion strokes of the low displacement cylinders through power assistance by the motor. As shown in FIG. 4C. Therefore, the motor is controlled such that power assistance by the motor is not achieved in the explosion strokes of the high displacement cylinders and such that traveling is performed at the maximum power as in the explosion strokes of the high displacement cylinders through power assistance by the motor only in the explosion strokes of the low displacement cylinders.

Figure 4D:
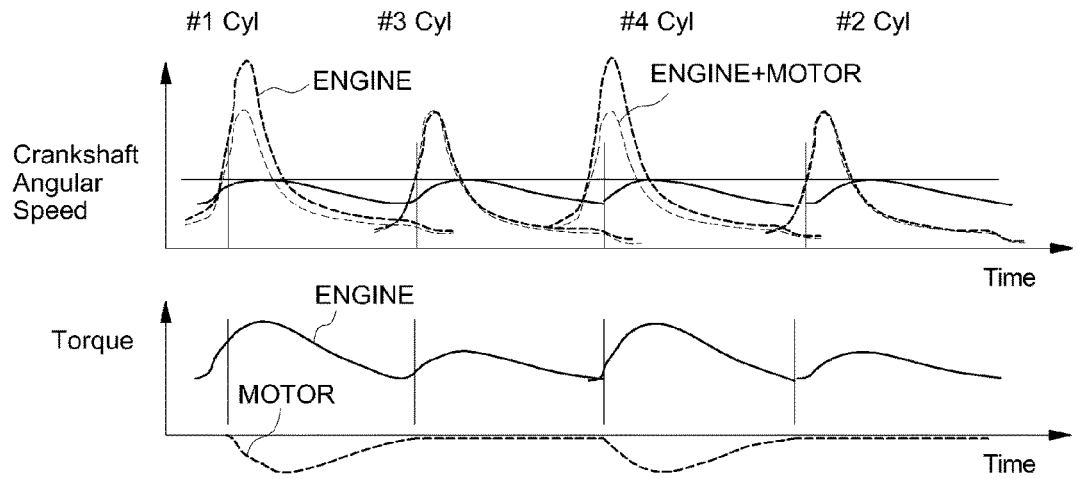

Meanwhile, motor control mode ④ is used for traveling at the minimum power of the non-uniform displacement engine. The motor is controlled such that excessive energy from the high displacement cylinders is recovered by the motor to achieve the minimum power of the given non-uniform displacement. In motor control mode ④, as shown in FIG. 4D, the motor is controlled such that power assistance by the motor is not achieved in the explosion strokes of the low displacement cylinders and such that negative torque is generated by energy regeneration in the explosion strokes of the high displacement cylinders, reversely to motor control mode ③. Particularly, in motor control mode ④, the motor is controlled based on the minimum power of the low displacement cylinders. Consequently, the motor is operated at uniform minimum power based on the low displacement cylinders.

Motor control modes ① to ④ may be selectively used by the motor control unit. For example, the motor control unit may store motor control modes ② to ④, which are different from one another, and may select any one of the motor control modes to control the motor.

In an embodiment of the present disclosure, it is possible to variably configure the substantial driving characteristics of the vehicle according to the utilization of the motor based on the high displacement and the low displacement of the non-uniform displacement engine. In particular, it is possible to elaborately perform variable displacement control within a set range of displacement through the use of the motor control modes.

Figure 5A:
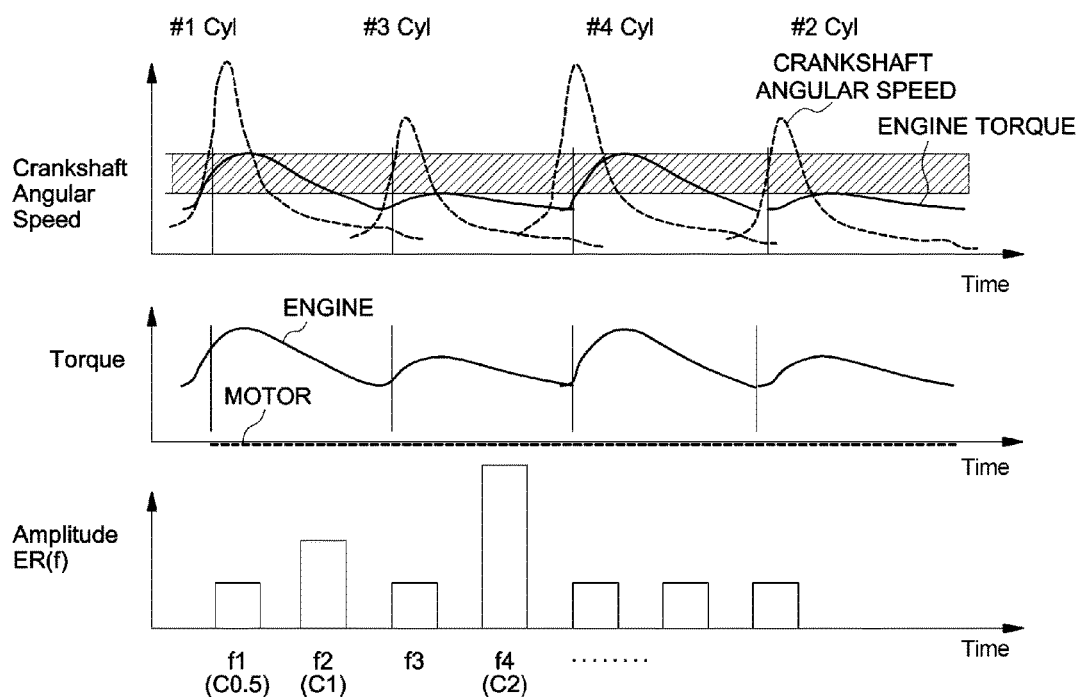
FIGS. 5A and 5B are graphs respectively showing normal control and compensation control modes of a non-uniform displacement engine control system in a frequency domain according to embodiments of the present disclosure.
Figure 5B:
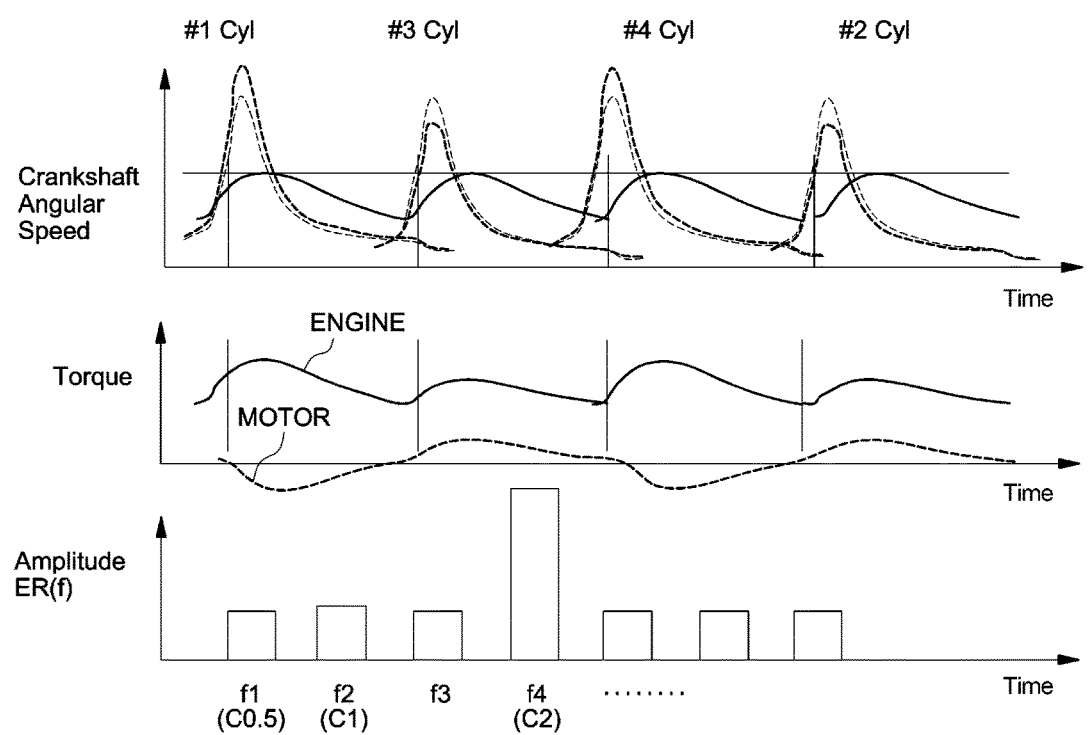

FIGS. 5A and 5B are graphs respectively showing normal control and compensation control modes of a non-uniform displacement engine control system in a frequency domain, particularly showing an improvement in the vibration characteristics. That is, in an example of FIG. 5A, a C1 component of the frequency domain is large, and, in an example of FIG. 5B, the C1 component of the frequency domain is greatly reduced through the use of control modes ② to ④, thereby greatly reducing vibration and noise.

Meanwhile, in an embodiment of the present disclosure, the non-uniform displacement engine control system and method may employ cylinder deactivation (CDA) in order to acquire the advantages of CDA in a low-load zone. To this end, the motor control unit performs control so as to adjust the torque amount of the motor based on a previous control mode at the time of entry into CDA such that mode switching is smoothly performed.

In connection with this case, the motor control unit has a selective transient state transition period for smooth switching to a CDA control mode. In the present disclosure, transient state transition means that, when switching is performed from the previous control mode to the CDA control mode, the mode switching is not immediately performed but an intermediate process of reducing the total torque is performed.

At the time of the transient state transition, therefore, control is performed to reduce some of the amount of torque to be reduced at the time of entry into CDA. The control to reduce the total torque is achieved by the release of power assistance by the motor or energy regeneration by the motor. A series of processes described hereinafter may be performed by the motor control unit or other controllers.

Figure 10:
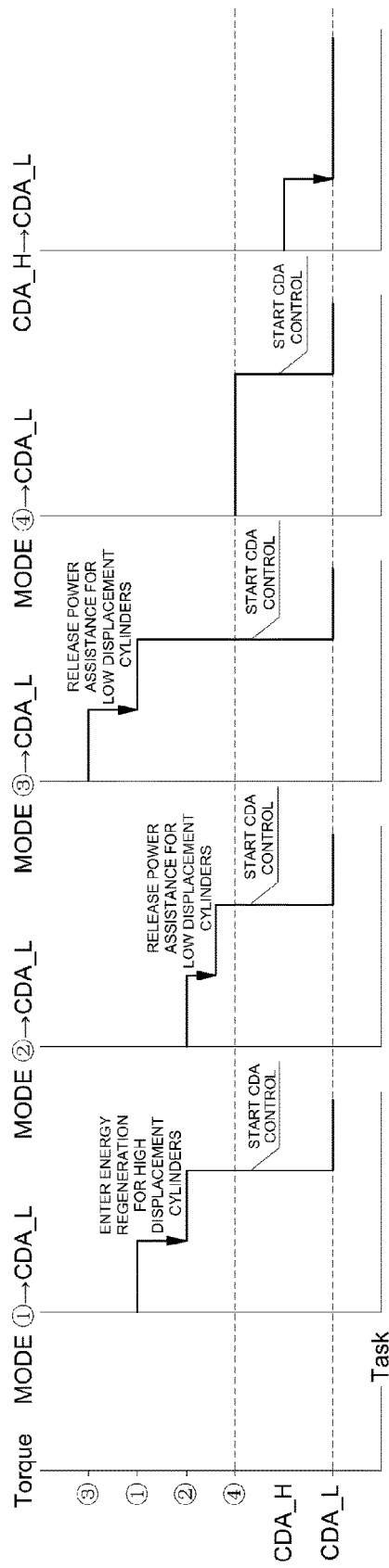
FIG. 10 is a view showing switching from a previous control mode to a CDA_L control mode according to an embodiment of the present disclosure.

Examples of the transient state transition period are shown in FIGS. 10 and 11. According to an embodiment, as shown in FIGS. 10 and 11, control is performed such that the total torque is stepwise reduced at the time of entry into the CDA control mode.

FIG. 10 is a view showing switching to a CDA_L control mode, in which the supply of fuel to the high displacement cylinders is cut, and FIG. 11 is a view showing switching to a CDA_H control mode, in which the supply of fuel to the low displacement cylinders is cut.

As shown in FIGS. 10 and 11, entry into CDA is not immediately performed at the time of switching between some modes. That is, transition to a transient state of reducing a predetermined amount of torque is performed, and then entry into CDA is performed. The transition to the transient state is indicated by arrows in FIGS. 10 and 11.

The transition to the transient state is not commonly performed at the time of switching to the CDA control mode. The transition to the transient state is selectively applied based on a control mode before switching, i.e. a previous control mode. In the case in which the transition to the transient state is not necessary based on a previous control mode, therefore, switching to the CDA control mode is immediately performed without performing the transition to the transient state.

Specifically, referring to FIG. 10, the transition to the transient state is performed only at the time of switching from control modes ①, ②, and ③ to the CDA_L control mode. In addition, referring to FIG. 11, the transition to the transient state is performed only at the time of switching from control modes ② and ③ to the CDA_H control mode.

At the time of switching from other control modes to the CDA control mode, on the other hand, entry into the CDA control mode is immediately performed without performing the transition to the transient state.

That is, according to an embodiment of the present disclosure, the transition to the transient state is performed for smooth switching to the CDA control mode but is selectively applied based on the type of the previous control mode and the type of the CDA mode to which the previous control mode is switched. In particular, the transition to the transient state at the time of switching to the CDA control mode may be performed according to prescribed rules.

Hereinafter, rules for performing the transition to the transient state in an embodiment of the present disclosure will be described.

According to an embodiment of the present disclosure, the motor control unit controls the total torque by adjusting motor driving torque or energy regeneration torque. That is, control modes ① to ④ described above are divided based on how the amount of power assistance by the motor (i.e. motor driving torque) and the amount of energy regeneration by the motor (i.e. energy regeneration torque) are adjusted. The transition to the transient state is also performed by adjusting the motor driving torque and the energy regeneration torque. At this time, in consideration of the non-uniform displacement engine, energy regeneration is performed for the high displacement cylinders, and power assistance is performed for the low displacement cylinders, as in control modes ① to ④. In addition, in an embodiment of the present disclosure, the CDA_H control mode and the CDA_L control mode may be performed only by the engine. However, depending on circumstances, however, the CDA_H control mode and the CDA_L control mode may be performed by cooperation of the engine and the motor.

Consequently, the transition to the transient state may be performed such that the total torque is reduced before entry into CDA, and the prior release of power assistance by the motor is performed, and energy regeneration by the motor may be performed as needed.

Specifically, power assistance by the motor, which is performed in the previous control mode, is determined to be released beforehand. That is, power assistance by the motor is determined to be unnecessary at the time of entry into CDA. Since the power assistance by the motor consumes the energy of the battery, the power assistance by the motor is released beforehand.

Consequently, the motor control unit beforehand determines whether power assistance was being performed by the motor in the previous control mode. If so, the power assistance by the motor is released beforehand.

Referring to FIGS. 10 and 11, the power assistance by the motor is released at the time of switching from control mode ② to the CDA control mode and switching from control mode ③ to the CDA control mode.

Next, control related to energy regeneration may be considered. In the case in which energy regeneration is not being performed, it is determined whether energy regeneration is to be performed. Specifically, in the case in which energy regeneration was not being performed for the high displacement cylinders in the previous control mode (i.e. in control modes ① and ③), it may be determined whether to perform energy regeneration for the high displacement cylinders. However, it is previously determined whether power assistance by the motor has been released. Upon determining that the power assistance by the motor has already been released, energy regeneration is not performed. In addition, in the case in which the low displacement cylinders are deactivated (i.e. in the case in which switching to the CDA_H control mode is being performed), new energy regeneration is not performed. The reason for this is that when energy regeneration is performed for the high displacement cylinders that are not deactivated, torque is decreased, and then when switching to the CDA_H control mode is performed, torque is increased due to the completion of energy regeneration, and thus smooth mode switching may not be performed.

In the case in which energy regeneration is not performed, energy regeneration is performed for the high displacement cylinders on the assumption that the high displacement cylinders are deactivated and power assistance has not been released. This corresponds to the case in which switching from control mode ① to CDA_L is performed in FIG. 10. Consequently, the torque of the high displacement cylinders is stepwise reduced.

In the case in which the energy regeneration is being performed, on the other hand, it is determined whether to maintain or release the energy regeneration. Specifically, in the case in which the energy regeneration is being performed for the high displacement cylinders in the previous control mode (i.e. in control modes ② and ④), the energy regeneration is released when the low displacement cylinders are deactivated. The reason for this is that since the high displacement cylinders are not deactivated in the CDA_H control mode, in which the low displacement cylinders are deactivated, the energy regeneration is released in advance. At this time, torque is expected to be increased due to the release of the energy regeneration. Consequently, the energy regeneration is released simultaneously with CDA control such that control is performed to reduce the total torque. As a result, the release of the energy regeneration and the start of the CDA control are simultaneously performed, as in control mode ② and control mode ④ of FIG. 11.

In an embodiment of the present disclosure, control is performed to maintain the energy regeneration in order to prevent an unnecessary increase of torque in the case in which the high displacement cylinders are deactivated even when the energy regeneration is being performed in the previous control mode. This corresponds to control modes ② and ④ of FIG. 10.

In addition, the previous control mode may be the CDA control mode. This example is shown in the last portion of FIGS. 10 and 11.

That is, in the case in which the previous control mode is the CDA_H control mode and switching to the CDA_L control mode is performed, as shown in FIG. 10, control may be performed such that energy regeneration is performed for the high displacement cylinders and then switching to the CDA_L control mode is performed in order to reduce torque in a stepwise manner.

In addition, in the case in which the previous control mode is the CDA_L control mode and switching to the CDA_H control mode is performed, control should be performed to increase torque. Consequently, control may be performed such that power assistance is performed for the low displacement cylinders and then switching to the CDA_H control mode is performed.

After performing the above processes, it is determined whether entry into CDA has been performed. If so, control is performed in the CDA control mode.

Figure 6:
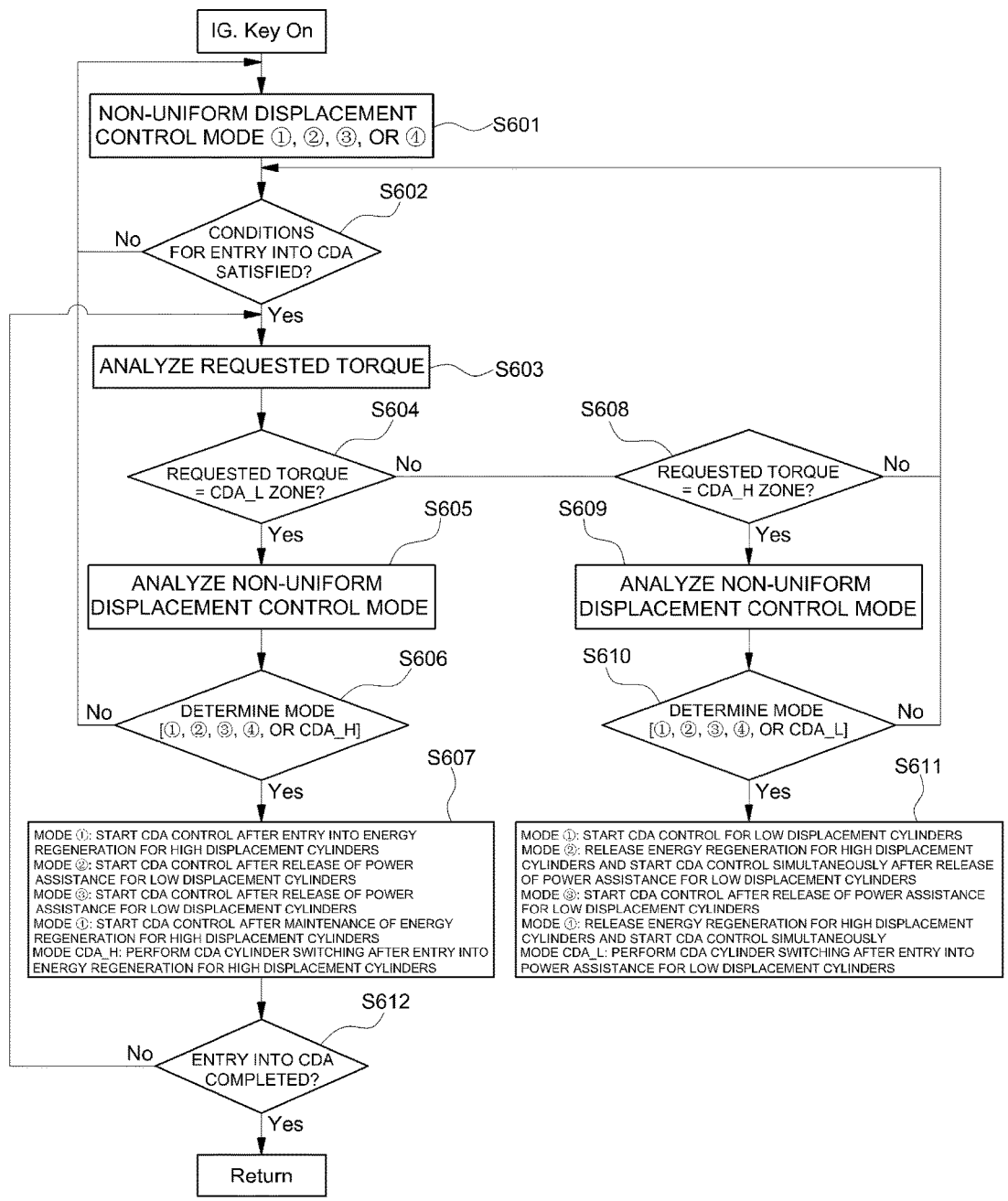
FIG. 6 is a flowchart showing a non-uniform displacement engine control method employing cylinder deactivation according to an embodiment of the present disclosure.

FIG. 6 is a flowchart showing a non-uniform displacement engine control method employing cylinder deactivation according to an embodiment of the present disclosure.

Referring to FIG. 6, non-uniform displacement control is performed in one of control modes ① to ④ after starting the vehicle (S601). During traveling, it may be determined whether conditions for entry into CDA are satisfied (S602). In this step, general conditions for entry into CDA, such as whether the engine is running normally and whether the operation zone has reached the level at which CDA is requested, may be determined.

Upon determining that the conditions for entry into CDA are satisfied, driver-requested torque is analyzed (S603), and it is determined whether the CDA_H control mode or the CDA_L control mode is to be performed based on the analyzed requested torque (S604 and S608).

Subsequently, a non-uniform displacement control mode is analyzed (S605 and S609). In these steps, it is determined which mode the previous control mode is. Upon determining the previous control mode (S606 and S610), predetermined control is performed based on information about the previous control mode (S607 and S611). Step S607 corresponds to the control method described with reference to FIG. 10, and Step S611 corresponds to the control method described with reference to FIG. 11.

When switching to the CDA control mode is performed through Step S607 or S611, it is determined whether the entry into CDA has been completed (S612). Upon determining that the entry into CDA has been completed, control is performed in the CDA control mode. Upon determining that the entry into CDA control mode has not been completed, the procedure returns to Step S603, and the above steps are performed again.

Figure 7:
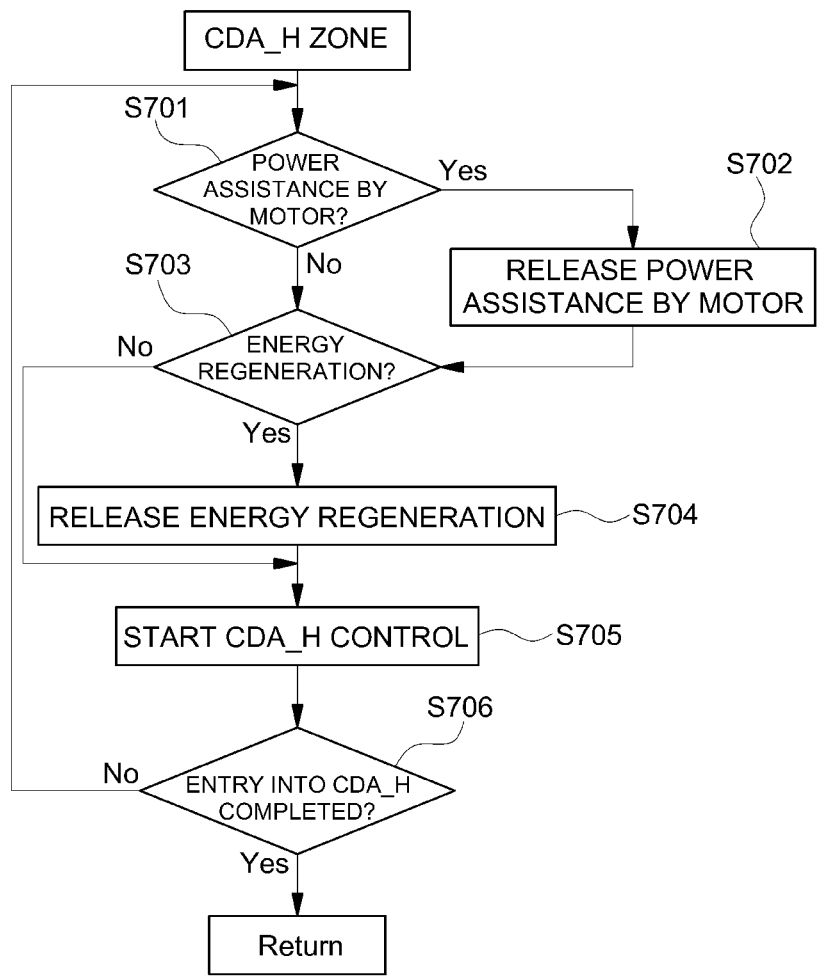
FIG. 7 is a flowchart showing an example of switching to a CDA_H control mode according to an embodiment of the present disclosure.
Figure 8:
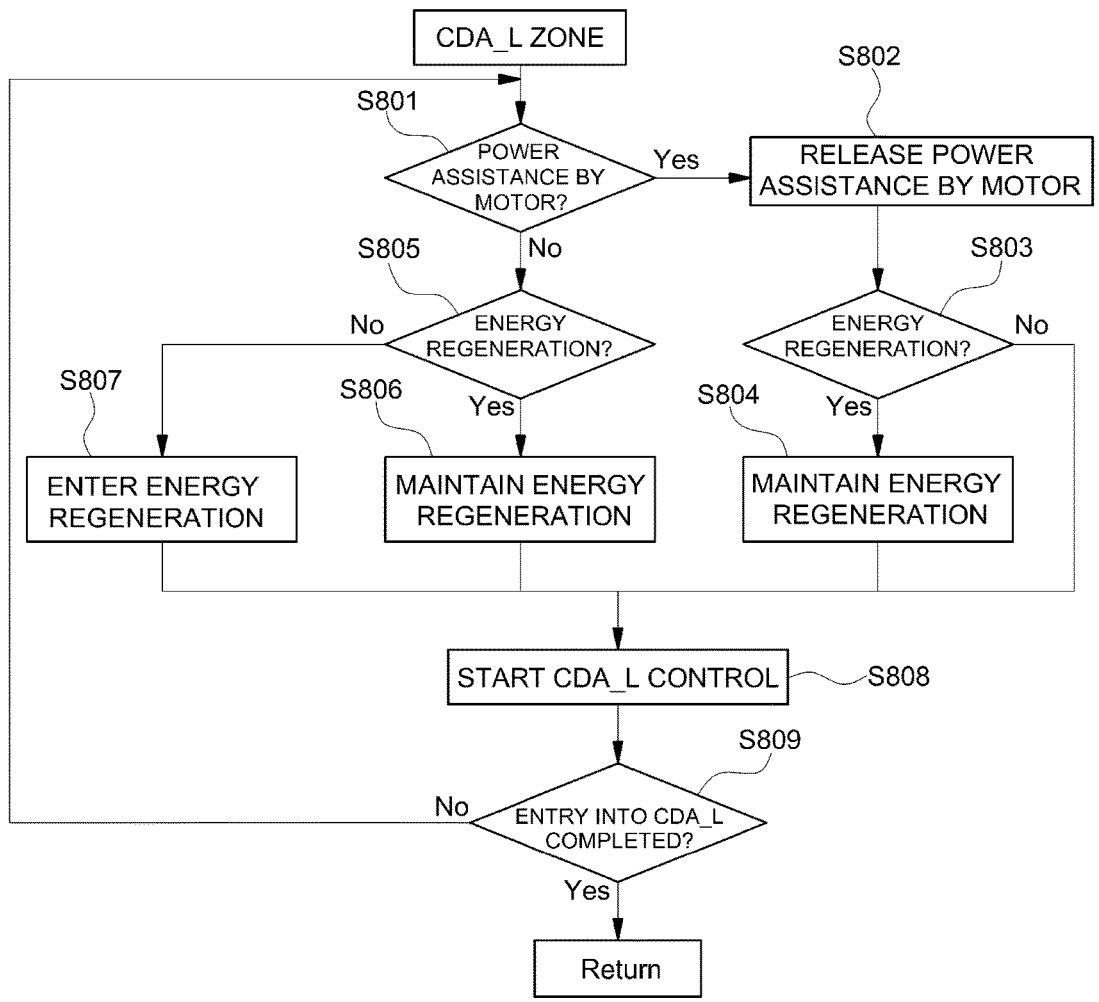
FIG. 8 is a flowchart showing an example of switching to a CDA_L control mode according to an embodiment of the present disclosure.

FIGS. 7 and 8 show switching to the CDA control mode based on power assistance and energy regeneration by the motor.

FIG. 7 shows switching to the CDA_H control mode.

Upon determining that the operation zone is the CDA_H zone through Steps S603 and S604 of FIG. 6, it is determined whether power assistance is being performed by the motor (S701). Upon determining that the power assistance is being performed by the motor, the power assistance by the motor is released (S702).

Subsequently, it is determined whether torque is decreased due to energy regeneration in the previous control mode (S703). Upon determining that the energy regeneration is being performed, control is performed such that the energy regeneration is selectively released based on information about the deactivated cylinders.

In the case in which the low displacement cylinders are deactivated as shown in FIG. 7, control is performed such that the energy regeneration is released (S704).

Subsequently, CDA_H control is performed (S705), and it is determined whether entry into CDA_H has been completed (S706) such that subsequent control is performed. Steps S704 and S705 may be simultaneously performed as shown in FIG. 11. That is, the release of the energy regeneration for the high displacement cylinders and the start of the CDA control may be simultaneously performed as in the case in which switching from control mode ② or control mode ④ to the CDA_H control mode is performed, as shown in FIG. 11.

FIG. 8 shows switching to the CDA_L control mode.

Upon determining that the operation zone is the CDA_L zone through Steps S603 and S608 of FIG. 6, it is determined whether power assistance is being performed by the motor (S801), as in FIG. 7. Upon determining that the power assistance is being performed by the motor, the power assistance by the motor is released (S802).

Subsequently, it is determined whether torque is decreased due to energy regeneration in the previous control mode (S803 and S805). Upon determining that energy regeneration is being performed, control is performed such that the energy regeneration is selectively released based on information about the deactivated cylinders.

In the case in which the high displacement cylinders are deactivated as shown in FIG. 8, control is performed such that energy regeneration is maintained (S804 and S806).

In the case in which energy regeneration is not being performed and power assistance by the motor has already been released (S802→S803), energy regeneration is not performed for the high displacement cylinders. On the other hand, in the case in which energy regeneration is not being performed and power assistance by the motor has not been released (S801→S805), energy regeneration is performed for the high displacement cylinders (S807).

After such transient state transition control is performed, CDA_L control is started (S808), and it is determined whether entry into CDA_L has been completed (S809) such that subsequent control is performed.

Figure 9:
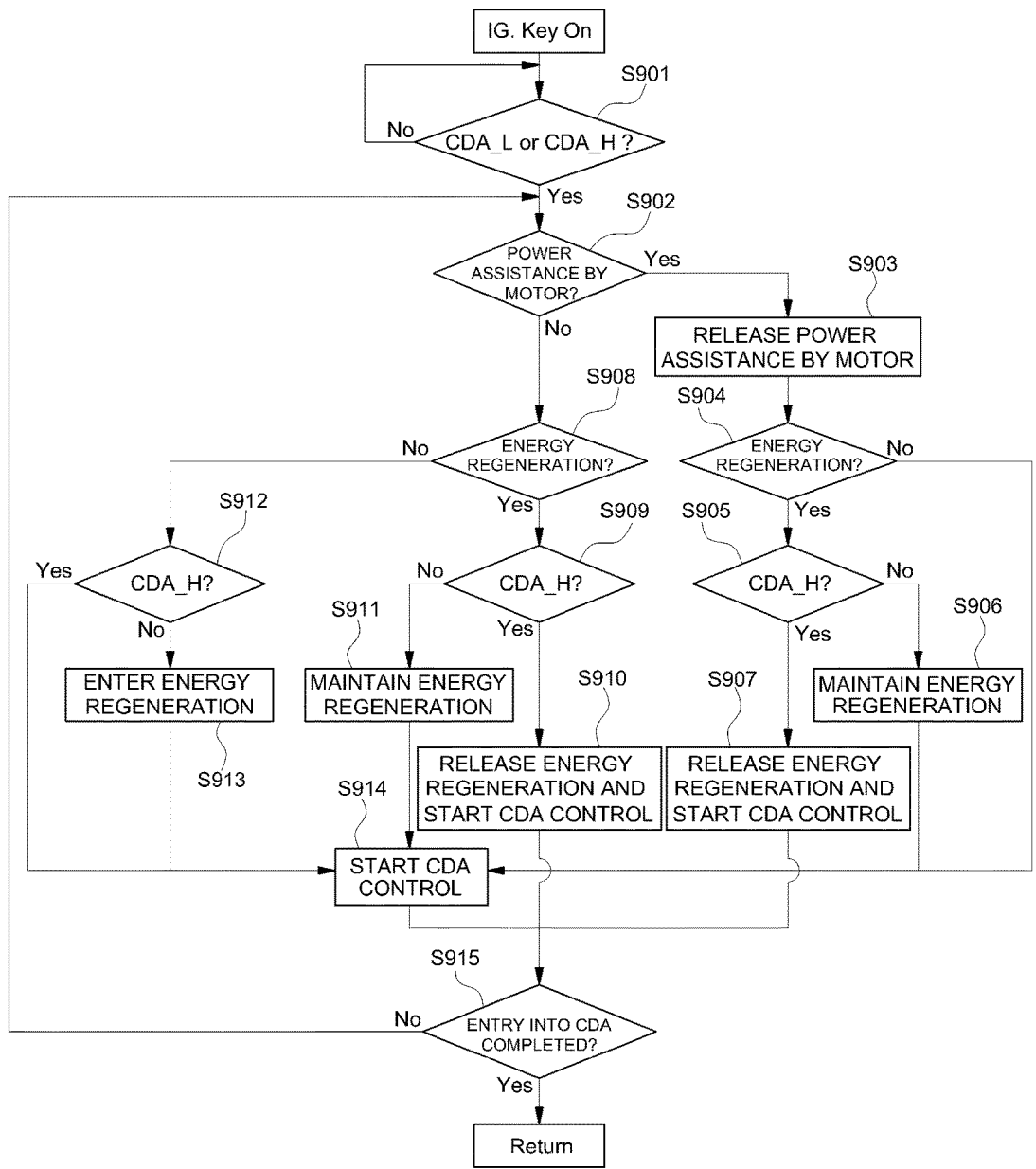
FIG. 9 is a flowchart showing a non-uniform displacement engine control method according to an embodiment of the present disclosure based on examples of FIGS. 7 and 8.

FIG. 9 is a flowchart showing a non-uniform displacement engine control method according to an embodiment of the present disclosure based on examples of FIGS. 7 and 8.

As in the previous examples, it is determined whether the operation zone is the CDA_H zone or the CDA_L zone (S901), and switching to CDA control including selective transient state transition is performed based on whether power assistance by the motor is performed and based on whether energy regeneration by the motor is performed.

That is, it is determined whether power assistance is being performed by the motor (S902), and if so, the power assistance by the motor is released (S903).

Subsequently, it is determined whether energy regeneration by the motor is being performed (S904 and S908), a CDA zone to which a previous control zone is switched based on requested torque is determined (S905, S909, and S912), and control related to energy regeneration is performed (S906, S907, S910, S911, and S913).

At Steps S907 and S910, the release of energy regeneration for the high displacement cylinders and the start of CDA control may be simultaneously performed in the same manner as described above.

Meanwhile, in the case in which it is determined to maintain the energy regeneration for the high displacement cylinders through Step S906 or S911 or in the case in which new energy regeneration for the high displacement cylinders is performed through Step S913, CDA control is started (S914). In the case in which it is determined at Step S904 that energy regeneration is not being performed in the previous control mode or in the case in which it is determined at Step S912 that the operation zone is the CDA_H zone, in which the low displacement cylinders are deactivated, CDA control is started (S914).

Subsequently, as shown in FIGS. 7 and 8, it is determined whether entry into the CDA control mode has been completed (S915) such that subsequent control is performed.

Stepwise torque reduction is performed through switching to the CDA control mode including the above transient state transition process, thereby achieving smooth switching to the CDA control mode.

As is apparent from the above description, an embodiment of the present disclosure may be used as a variable displacement engine and a control system in a vehicle using an engine and a motor as a power source, as in a hybrid vehicle.

In addition, in an embodiment of the present disclosure, modes based on traveling conditions may be selectively embodied. Consequently, it is possible to variously perform control in operation zones, such as the exhibition of power performance or the optimization of fuel efficiency, as described.

In addition, in an embodiment of the present disclosure, it is possible to increase freedom in the control of the hybrid vehicle, thereby proposing a new paradigm for control of the operation of the hybrid vehicle.

In particular, according to the present disclosure, it is possible to configure a driving system such that variable displacement control is elaborately or variously performed through the use of the motor within a set variable range.

In addition, it is possible to entirely or partially solve vibration and noise problems caused by the non-uniform displacement engine, thereby improving travelling efficiency.

In addition, in an embodiment of the present disclosure, it is possible to extend the CDA period and to follow subdivided and stepwise requested torque in the non-uniform displacement engine system. Consequently, it is possible to extend the control zone of the non-uniform displacement engine system through the connection with stepwise CDA control to all of the cylinders. In addition, control may be performed so as to achieve smooth switching between the respective control modes by adjusting the amount of torque of the motor based on the predetermined control mode. Consequently, the comfort of the driver and passengers during traveling may be improved.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A non-uniform displacement engine control system employing cylinder deactivation comprising:
    a non-uniform displacement engine including a plurality of cylinders, the cylinders including at least two sizes of cylinders having different displacements;
    a motor connected to a driving shaft of the engine;
    a battery for supplying electrical energy to the motor; and
    a motor control unit for controlling the motor, wherein
    the motor control unit controls total torque by adjusting motor driving torque or energy regeneration torque and performs control such that cylinder deactivation (CDA) is performed after selectively performing a transient state transition based on a previous control mode at a time of switching to a CDA control mode,
    wherein, at a time of the transient state transition, the motor control unit adjusts the motor driving torque or the energy regeneration torque such that the total torque is reduced before entering the CDA control mode.

2. The non-uniform displacement engine control system of claim 1, wherein, at the time of the transient state transition, the motor control unit determines whether power assistance is being performed by the motor in the previous control mode and, upon determining that the power assistance is being performed by the motor, performs control such that the power assistance by the motor is released.

3. The non-uniform displacement engine control system of claim 2, wherein, at the time of the transient state transition, the motor control unit determines whether torque is reduced due to energy regeneration in the previous control mode and, upon determining that the energy regeneration is being performed, performs control such that the energy regeneration is selectively released based on information about deactivated cylinders.

4. The non-uniform displacement engine control system of claim 3, wherein, upon determining that the energy regeneration is being performed in the previous control mode, the motor control unit performs control such that the energy regeneration is released in a case in which the deactivated cylinders are low displacement cylinders.

5. The non-uniform displacement engine control system of claim 3, wherein, upon determining that the energy regeneration is being performed in the previous control mode, the motor control unit performs control such that the energy regeneration is maintained in a case in which the deactivated cylinders are high displacement cylinders.

6. The non-uniform displacement engine control system of claim 3, wherein, upon determining that the energy regeneration is not being performed in the previous control mode, the motor control unit performs control such that the energy regeneration by the motor is performed so as to achieve the transient state transition in a case in which the power assistance is not performed in the previous control mode and the deactivated cylinders are high displacement cylinders.

7. The non-uniform displacement engine control system of claim 4, wherein the motor control unit performs control such that the release of the energy regeneration and the CDA control are performed simultaneously.

8. The non-uniform displacement engine control system of claim 1, wherein
    in a case in which the previous control mode is the CDA control mode for high displacement cylinders, the motor control unit performs control such that switching to the CDA control mode for low displacement cylinders is performed after a transient state transition process of controlling the motor such that the energy regeneration is performed in explosion strokes of the high displacement cylinders, and
    in a case in which the previous control mode is the CDA control mode for low displacement cylinders, the motor control unit performs control such that switching to the CDA control mode for high displacement cylinders is performed after a transient state transition process of controlling the motor such that power assistance by motor torque is performed in explosion strokes of the low displacement cylinders.

9. The non-uniform displacement engine control system of claim 1, wherein the motor control unit includes:
    a first mode for performing control such that power assistance and energy regeneration by the motor are not performed;
    a second mode for controlling the motor such that energy regeneration is achieved in explosion strokes of high displacement cylinders and controlling the motor such that power assistance is achieved by motor torque in explosion strokes of low displacement cylinders;
    a third mode for controlling the motor such that the motor is not driven in the explosion strokes of the high displacement cylinders and controlling the motor such that power assistance is achieved by motor torque in the explosion strokes of the low displacement cylinders; and
    a fourth mode for controlling the motor such that energy regeneration is achieved in the explosion strokes of the high displacement cylinders and controlling the motor such that the motor is not driven in the explosion strokes of the low displacement cylinders.

10. The non-uniform displacement engine control system of claim 9, wherein, in a case in which the CDA control mode to which the previous control mode is switched is the CDA control mode for the high displacement cylinders, the motor control unit performs:
    switching to the CDA control mode after a transient state transition in which the energy regeneration for the high displacement cylinders is performed when the previous control mode is the first mode;
    switching to the CDA control mode after a transient state transition in which the power assistance by the motor for the low displacement cylinders is released when the previous control mode is the second mode;
    switching to the CDA control mode after a transient state transition in which the power assistance by the motor for the low displacement cylinders is released when the previous control mode is the third mode; and switching to the CDA control mode without a transient state transition when the previous control mode is the fourth mode.

11. The non-uniform displacement engine control system of claim 9, wherein, in a case in which the CDA control mode to which the previous control mode is switched is the CDA control mode for the low displacement cylinders, the motor control unit performs:
switching to the CDA control mode without a transient state transition when the previous control mode is the first mode;
switching to the CDA control mode simultaneously with release of the energy regeneration for the high displacement cylinders after a transient state transition in which the power assistance by the motor for the low displacement cylinders is released when the previous control mode is the second mode;
switching to the CDA control mode after a transient state transition in which the power assistance by the motor for the low displacement cylinders is released when the previous control mode is the third mode; and
switching to the CDA control mode without a transient state transition when the previous control mode is the fourth mode.

12. A control method of a system comprising a non-uniform displacement engine comprising a plurality of cylinders, the cylinders comprising at least two sizes of cylinders having different displacements; a motor connected to a driving shaft of the engine; and a motor control unit for controlling the motor, the control method comprising:
driving the non-uniform displacement engine;
determining motor driving torque or energy regeneration torque for each cylinder based on a predetermined control mode by the motor control unit;
controlling the motor based on the determined motor driving torque or energy regeneration torque;
determining whether to perform switching to a CDA control mode; and
when switching to the CDA control mode is performed, performing CDA after a selective transient state transition based on a previous control mode,
wherein, at a time of the transient state transition, the motor control unit adjusts the motor driving torque or the energy regeneration torque such that total torque is reduced before entering the CDA control mode.

13. The control method of claim 12, wherein, at the time of the transient state transition, the motor control unit determines whether power assistance is being performed by the motor in the previous control mode and, upon determining that the power assistance is being performed by the motor, performs control such that the power assistance by the motor is released.

14. The control method of claim 13, wherein, at the time of the transient state transition, the motor control unit determines whether torque is reduced due to energy regeneration in the previous control mode and, upon determining that the energy regeneration is being performed, perform control such that the energy regeneration is selectively released based on information about deactivated cylinders.

15. The control method of claim 14, wherein, upon determining that the energy regeneration is being performed in the previous control mode, the motor control unit performs control such that the energy regeneration is released in a case in which the deactivated cylinders are low displacement cylinders.

16. The control method of claim 14, wherein, upon determining that the energy regeneration is being performed in the previous control mode, the motor control unit performs control such that the energy regeneration is maintained in a case in which the deactivated cylinders are high displacement cylinders.

17. The control method of claim 14, wherein, upon determining that the energy regeneration is not being performed in the previous control mode, the motor control unit performs control such that the energy regeneration by the motor is performed so as to achieve the transient state transition in a case in which the power assistance is not performed in the previous control mode and the deactivated cylinders are high displacement cylinders.

18. The control method of claim 15, wherein the motor control unit performs control such that the release of the energy regeneration and the CDA control are performed simultaneously.

19. The control method of claim 12, wherein
in a case in which the previous control mode is the CDA control mode for high displacement cylinders, the motor control unit performs control such that switching to the CDA control mode for low displacement cylinders is performed after a transient state transition process of controlling the motor such that the energy regeneration is performed in explosion strokes of the high displacement cylinders, and
in a case in which the previous control mode is the CDA control mode for low displacement cylinders, the motor control unit performs control such that switching to the CDA control mode for high displacement cylinders is performed after a transient state transition process of controlling the motor such that power assistance by motor torque is performed in explosion strokes of the low displacement cylinders.

20. The control method of claim 12, wherein the predetermined control mode comprises:
a first mode for performing control such that power assistance and energy regeneration by the motor are not performed;
a second mode for controlling the motor such that energy regeneration is achieved in explosion strokes of high displacement cylinders and controlling the motor such that power assistance is achieved by motor torque in explosion strokes of low displacement cylinders;
a third mode for controlling the motor such that the motor is not driven in the explosion strokes of the high displacement cylinders and controlling the motor such that power assistance is achieved by motor torque in the explosion strokes of the low displacement cylinders; and
a fourth mode for controlling the motor such that energy regeneration is achieved in the explosion strokes of the high displacement cylinders and controlling the motor such that the motor is not driven in the explosion strokes of the low displacement cylinders.

21. The control method of claim 20, wherein, in a case in which the CDA control mode to which the previous control mode is switched is the CDA control mode for the high displacement cylinders, the motor control unit performs:
switching to the CDA control mode after a transient state transition in which the energy regeneration for the high displacement cylinders is performed when the previous control mode is the first mode;
switching to the CDA control mode after a transient state transition in which the power assistance by the motor for the low displacement cylinders is released when the previous control mode is the second mode;

switching to the CDA control mode after a transient state transition in which the power assistance by the motor for the low displacement cylinders is released when the previous control mode is the third mode; and switching to the CDA control mode without a transient state transition when the previous control mode is the fourth mode.

22. The control method of claim 20, wherein, in a case in which the CDA control mode to which the previous control mode is switched is the CDA control mode for the low displacement cylinders, the motor control unit performs:

switching to the CDA control mode without a transient state transition when the previous control mode is the first mode;

switching to the CDA control mode simultaneously with release of the energy regeneration for the high displacement cylinders after a transient state transition in which the power assistance by the motor for the low displacement cylinders is released when the previous control mode is the second mode;

switching to the CDA control mode after a transient state transition in which the power assistance by the motor for the low displacement cylinders is released when the previous control mode is the third mode; and switching to the CDA control mode without a transient state transition when the previous control mode is the fourth mode.

* * * * *